(12) United States Patent
Davis et al.

(10) Patent No.: US 7,192,086 B2
(45) Date of Patent: Mar. 20, 2007

(54) COVER FOR INFANT/CHILD SEAT

(76) Inventors: Robert Davis, 1163 Pomona Rd., Corona, CA (US) 92882; Jennie Enholm, 1163 Pomona Rd., Corona, CA (US) 92882

( * ) Notice: Subject to any disclaimer, the term of this patent is extended or adjusted under 35 U.S.C. 154(b) by 0 days.

(21) Appl. No.: 10/982,642

(22) Filed: Nov. 5, 2004

(65) Prior Publication Data

US 2006/0108842 A1    May 25, 2006

Related U.S. Application Data

(60) Provisional application No. 60/518,557, filed on Nov. 7, 2003.

(51) Int. Cl.
*A47C 31/00* (2006.01)
*A47C 7/62* (2006.01)

(52) U.S. Cl. ............... 297/219.12; 297/184.13

(58) Field of Classification Search ........... 297/219.12, 297/219.1, 228.11, 228.13, 224, DIG. 6, 297/184.13, 250.1, 229, 228.1, 256.17

See application file for complete search history.

(56) References Cited

U.S. PATENT DOCUMENTS

| | | | | |
|---|---|---|---|---|
| 4,810,030 | A * | 3/1989 | Lewis | 297/184.17 |
| 5,678,887 | A * | 10/1997 | Sher | 297/250.1 |
| 5,735,576 | A * | 4/1998 | Pepys et al. | 297/397 |
| 5,988,742 | A * | 11/1999 | Stevens | 297/219.12 |
| 6,164,721 | A * | 12/2000 | Latshaw et al. | 297/256.17 |
| 6,296,307 | B1 * | 10/2001 | Holtke | 297/219.12 |
| 6,394,543 | B1 * | 5/2002 | Dunne et al. | 297/219.12 |
| 2005/0110315 | A1 * | 5/2005 | Littlehorn et al. | 297/219.12 |

* cited by examiner

Primary Examiner—Milton Nelson, Jr.
(74) Attorney, Agent, or Firm—Colin P. Abrahams

(57) ABSTRACT

A seat cover for an infant/child seat having a seat portion and a back portion and straps for securing an infant/child within the seat comprises a cover member for mounting on at least a part of the seat portion and/or back portion of the infant/child seat. At least one aperture is formed in the cover member for receiving a strap to allow a part of the strap to pass therethrough. A fastener is formed on at least one of the apertures for opening and closing at least a portion of the aperture.

17 Claims, 3 Drawing Sheets

COVER FOR INFANT/CHILD SEAT

CROSS REFERENCE TO RELATED APPLICATIONS

This application claims the benefit of U.S. Provisional Patent Application No. 60/518,557 filed Nov. 7, 2003, which is incorporated herein in its entirety.

FIELD AND BACKGROUND OF THE INVENTION

This invention relates to covers for infant and/or child seats, and, in one form, to infant/child seats for use in vehicles such as cars, aircraft, and the like. The infant/child seat may be a personal infant/child carrier used in the home, or carried or used with a stroller. However, the cover of the invention for use with the infant/child seats may also be used in many other contexts, including general home use.

Infant/child seats are well known and extensively used by parents of young children, ranging in age from new born infants and toddlers all the way up to older children who may be ten or eleven years of age. A typical infant/child seat may comprise a molded frame, often made of a hard plastic material, configured in the shape of a chair with a seat portion for sitting on and a back portion to support the back. The frame may be designed so as to fit within a vehicle, such as a car or an airplane, in such a way that it can utilize the existing seat belts in the car or airplane whereby the infant/child's seat can be firmly and securely attached to the regular car seat and frame or chassis of the vehicle. For seats for infants and/or younger children, the frame of the seat may itself attach to an intermediate base (typically included with the seat) which fits in, and may be appropriately secured to, the seat or other structure of a car or airplane. When properly installed and fastened in a vehicle, the infant/child seat is therefore securely anchored, which naturally increases the safety of the infant/child in the seat in case of an accident. In many jurisdictions, infant/child seats for children below a certain size and/or weight are mandated by local and/or federal law.

In addition to having connections which enable the infant/child seat to be anchored to the vehicle in which it is mounted, the infant/child seat will typically have its own seat belt configuration so that the infant/child can be strapped in the seat, especially when the seat itself is anchored to the vehicle. In a conventional type of infant/child seat, the seat belt configuration will comprise a pair of lateral shoulder straps over the back portion of the seat and a central seat area strap which is located between the legs of the infant/child in use. The infant/child is strapped into the infant/child seat using a shoulder strap over each of the shoulders of the infant/child, and the shoulder straps fasten to the central seat area strap, preferably with a releasable locking mechanism. The shoulder straps themselves may merge with, or converge toward, each other before locking with the central seat area strap, or they may separately be attached to the locking mechanism which would, therefore, constitute the meeting point for all three straps. This configuration may create a five point safety restraint system.

The typical infant/child seat will also have a cushioning or a mattress which will provide greater comfort to the infant/child. The cushioning will in most cases cover the seat portion as well as the back portion of the infant/child seat, and conventionally comprises a single piece shaped and dimensioned to fit the contours of at least a part of the seat portion and back portion of the infant/child seat frame. The cushioning will typically have a fabric exterior which surrounds and accommodates a soft foam or other material which is present to make the cushioning comfortable.

The cushioning is often a decorated fabric and must be properly installed on the infant/child seat frame. Thus, the cushioning will have slots or holes appropriately located to permit both the shoulder straps as well as the central area strap to pass therethrough for use on the infant/child. The slots must be properly located so that the shoulder straps and the central area strap are not functionally impeded, and the cushioning is also correctly mounted on the seat. Installing the cushioning will thus often involve the dismantling of one or more of the shoulder straps and central area strap with respect to the infant/child seat, positioning the cushioning on the frame seating area, and thereafter rethreading the shoulder and cental area straps through the slots and/or holes both in the infant/child seat as well as in the cushioning for further operation and use.

Installing the cushioning can sometimes prove a time consuming and/or complicated task, since it may involve dismantling the infant/child seat straps and then reassembling though the various slots, anchors, clasps and other types of hardware that the infant/child seat may have. There is also the risk that incorrect installation of the various straps making up the seat belt configuration could occur, compromising the effectiveness of the infant/child seat and its safety, which would of course be undesirable.

Furthermore, the cushioning often becomes dirty and requires frequent washing and cleaning in order to remove food, debris and various stains which may typically develop. As such, one option which is available with respect to infant/child seats to instal a protective or decorative cover over the cushioning of the infant/child seat, which has the effect of shielding the original cushioning. Further, different patterns of covers may be used as desired.

The problem of installation of the cover for the infant/child seat is much the same as that encountered in the installation of the cushioning itself. While slots or apertures are provided in the cover for the infant/child seat, the process of disconnecting the various seat belts and then reinstalling them in the correct manner persists.

SUMMARY OF THE INVENTION

According to one aspect of the invention, there is provided a seat cover for an infant/child seat having a seat portion and a back portion and straps for securing an infant/child within the seat, the seat cover comprising: a cover member for mounting on at least a part of the seat portion and/or back portion of the infant/child seat; at least one aperture formed in the cover member for receiving a strap to allow a part of the strap to pass therethrough; and fastening means on at least one of the apertures for opening and closing at least a portion of the aperture.

Preferably, the cover member is mounted over the seat portion and back portion of the seat, and the cover member comprises an elasticized peripheral edge to facilitate releasable attachment of the cover member to the seat.

In a preferred form of the invention, the cover member has a seat cover portion for covering the seat portion of the seat and a back cover portion for covering the back portion of the seat.

The apertures may comprise a pair of elongate slots in the back cover portion of the cover member, the pair of elongate slots being positioned on the back cover portion so as to correspond approximately to the position of the straps on the back portion of the infant/child seat. Each elongate slot may have a longitudinal edge, and the fastening means is located along at least a portion of or adjacent to the longitudinal edge.

Preferably, each elongate slot comprises an upper region and a lower region, with an intermediate region therebetween, the fastening means being configured so as to fasten the longitudinal edges of the intermediate region to close the elongate slots at the intermediate region, with the upper region and lower region being open.

The fastening means comprises Velcro® strips, buttons, a zipper, a plurality of hook-and-eye connectors and/or a plurality of fastening studs.

The seat cover may further comprise an aperture in the seat cover portion for receiving a strap from the seat portion of the seat.

In one embodiment, the seat cover further comprises a hood associated therewith, the hood being mountable on the seat in an adjustable manner so as to provide a protective shield or barrier when located in a selected position.

In a preferred embodiment, the seat cover is for a seat where the back portion thereof has two shoulder straps, each shoulder strap extending from a rear of the back portion to a front of the back portion through an upper and lower slot respectively, the aperture on the cover member comprising an elongate slot extending at least from the upper slot to the lower slot for the shoulder straps, the fastening means of the apertures being formed along edges of the apertures between the upper slot and the lower slot.

According to another aspect of the invention, there is provided a method of mounting a seat cover on an infant/child seat having a seat portion and a back portion, and straps for securing an infant/child in the seat, the method comprising: forming an elongate aperture in the seat cover, the aperture extending at least between a first point at which a strap crosses from the rear of the seat to the front of the seat, and a second point at which the same strap crosses from the front of the seat to the rear of the seat, and providing a fastening member along at least a portion of the aperture; and either opening the aperture by unfastening the fastening means to enable to seat cover to be removed without interference from the straps, or closing the aperture by fastening the fastening means when the straps have been pulled therethrough so as to leave openings only at or about the first and second points where the straps cross between the front of the seat and the rear of the seat.

According to a further aspect of the invention, there is provided a cover for an infant/child's seat including a seating area and seat belts for securing an infant/child in the seating area, the cover comprising a shaped fabric to substantially conform to the contours of the seating area, at least one aperture formed in the shaped fabric for receiving at least one of the seat belts, and closure means for at least partially closing the aperture when the seat belt has been passed therethrough. Preferably, there is an aperture for each shoulder strap of the infant/child seat, the aperture having a closure means.

Preferably, the cover can be fairly rapidly installed and removed, and may cover the entire seating area as well as the back area of the seat.

Preferably, the apertures are of sufficient size and length to allow the seat belt(s) to be drawn therethrough without the need to remove the seat belts from their installed position on the infant/child seat. The cover is therefore able to be placed over the seating area, the seat belts pulled through the apertures into an operational position, and the apertures then at least partially closed off so that openings only remain where needed to allow the seat belts to feed onto the seat area.

Preferably, the closure means may comprise Velcro™ strips along one or more edges, or portions, of the cover with corresponding Velcro™ strips formed on the opposite edge, or portion, of the aperture so that the aperture can be closed off at least partially when the Velcro™ strips are connected to each other. When so connected, the apertures will preferably be substantially sealed except for those areas where an opening for the seat belt is required. The closure means may comprise means other than Velcro™, for example buttons, hooks and eyes, fastening studs, zippers or other forms of closing mechanisms, including any combination thereof.

The cover of the invention facilitates relatively rapid installation, removal and/or replacement of a seat cover without the need to remove or alter the seat belt(s) on the infant/child seat, and also permits the receiving apertures to be largely closed once the cover is installed to provide a substantially full cover to all or most parts of the seating area.

BRIEF DESCRIPTION OF THE DRAWINGS

Reference is now made to the drawings. In the drawings.

DETAILED DESCRIPTION OF THE INVENTION

Figure 1:
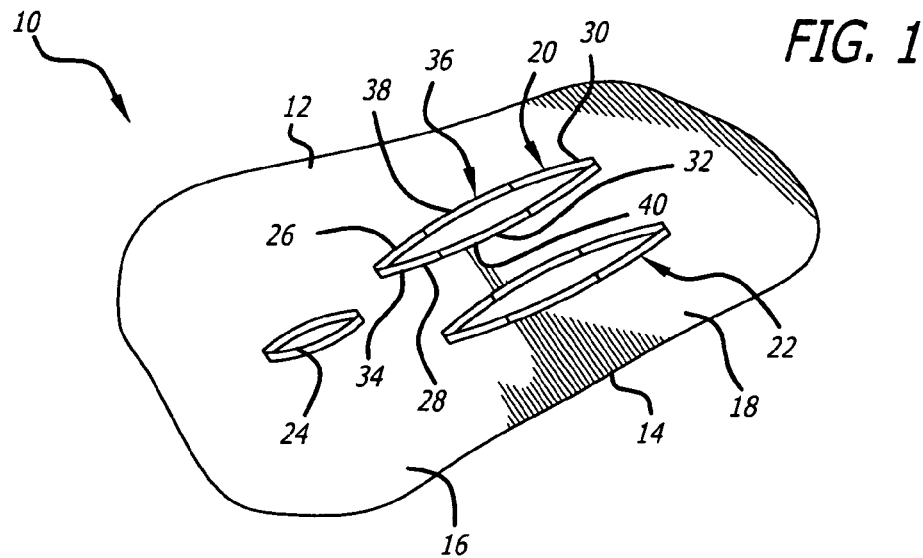
FIG. 1 is a perspective view of an uninstalled seat cover in accordance with one embodiment of the invention, showing the apertures in an open position.

Referring now to the drawings, and particularly FIG. 1 thereof, there is shown a seat cover 10 of the invention. The seat cover 10 comprises a cover section 12 which has a peripheral edge 14 which may be elasticized so that it can easily fasten or engage in a releasable manner to the infant/child seat. The cover section 12 has generally two areas, namely a seat area 16 and a back area 18 which, respectively, cover the seat and the back of the infant/child seat. Two approximately parallel lateral slots 20 and 22 are formed within the back area 18 and a single slot 24 is formed in the seat area 16.

Each lateral slot 20 and 22 has a pair of edges 26 and 28 and each edge 26 and 28 has an upper section 30, a middle section 32, and a lower section 34. Along the middle section 32 of each edge 26 and 28, there is formed a fastening mechanism 36. The fastening mechanism 36 comprises a first Velcro™ strip 38 on the edge 26 and a corresponding second Velcro™ strip 40 along the edge 28. The first and second Velcro™ strips 38 and 40 can easily be releasably fastened to and unfastened from each other. Fastening has the effect of closing off at least a portion of the lateral slots 20 and 22, while conversely, unfastening the first and second Velcro™ strips 38 and 40 opens these lateral slots 20 and 22.

Figure 3:
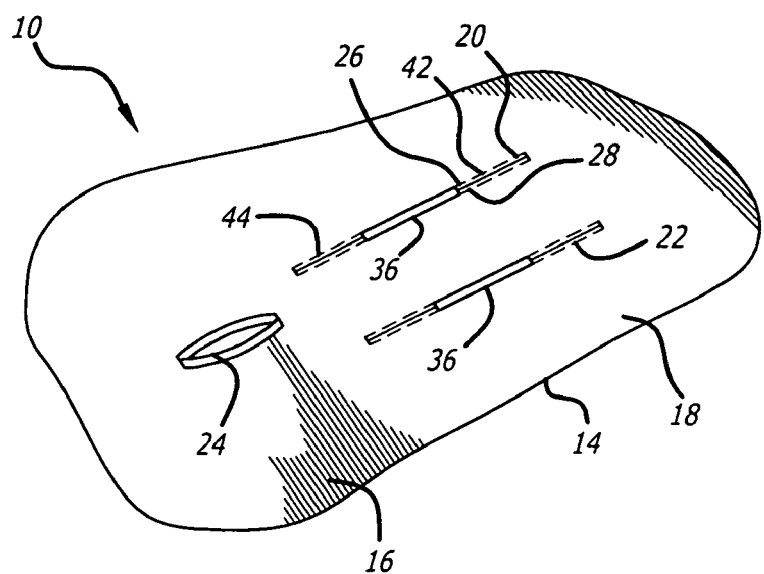
FIG. 3 is a perspective view of the uninstalled seat cover shown in FIG. 1 of the drawings, but shown with the apertures in the closed or fastened position.

Reference is made to FIG. 3 of the drawings which illustrates the seat cover 10 as shown in FIG. 1, but with the first and second Velcro™ strips 38 and 40 of both of the lateral slots 20 and 22 closed off. In this configuration, only smaller apertures 42 and 44 will allow the slots 20 and 22 to part at their edges 26 and 28 to accommodate the seat belts as will be described in more detail below. Note that the central slot 24 does not typically require any fastening since it need only be small to allow a central seat strap to be pulled therethrough.

Figure 2:
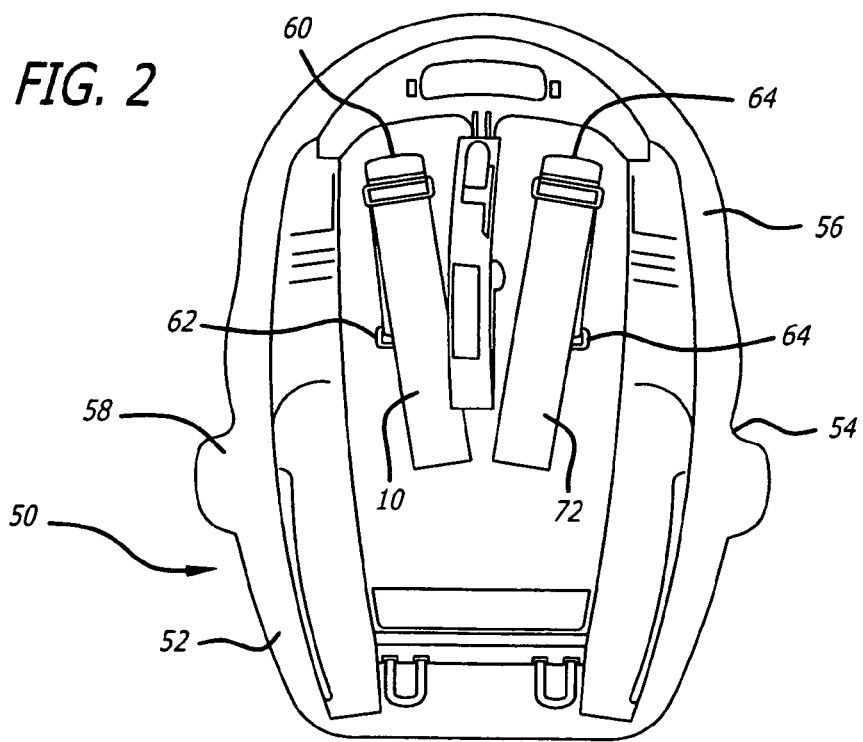
FIG. 2 is a back view of a conventional infant/child seat for use in a vehicle showing a portion of some of the seat belts used.

In FIG. 2, the rear of a car seat 50 is shown. The car seat 50 has a frame 52 molded to provide a seat 54, a back 56 and side walls 58 on each side of the seat 54. The car seat 50 can be secured in a vehicle in conventional fashion. The back 56 has a left upper orifice 60, a left lower orifice 62, a right upper orifice 64 and a right lower orifice 66. Each of the upper sections 30 of the slots 20 and 22 are formed to be at the approximate location of the upper orifices 60 and 64. Each of the lower sections 34 of the slots 20 ands 22 are formed to be at the approximate location of the lower orifices 62 and 66. The orifices 60 and 62 are adapted to fit one shoulder seat belt 70 while the orifices 64 and 66 are adapted to fit the other shoulder seat belt 72.

The seat belt 70 passes through the upper section 30 of slot 20 to the front of the seat back 56 and then back behind the seat back 56 by passing through the lower section 34 of the slot 20. Similarly, the seat belt 72 passes through the upper section 30 of slot 22 to the front of the seat back 56 and then back behind he seat back 56 by passing through the lower section 34 of the slot 22.

Figure 4:
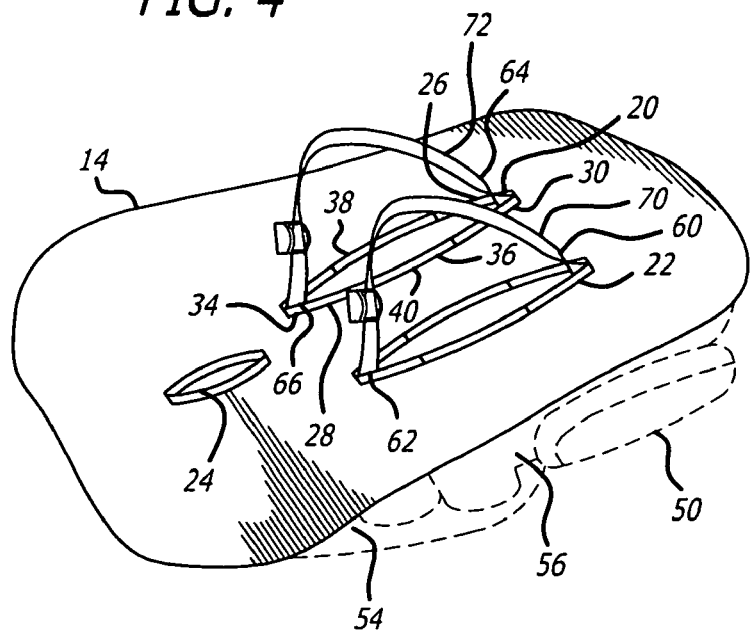
FIG. 4 is a perspective view of the seat cover shown in FIG. 1 of the drawings when mounted on a infant/child seat, with the apertures in the open position.
Figure 5:
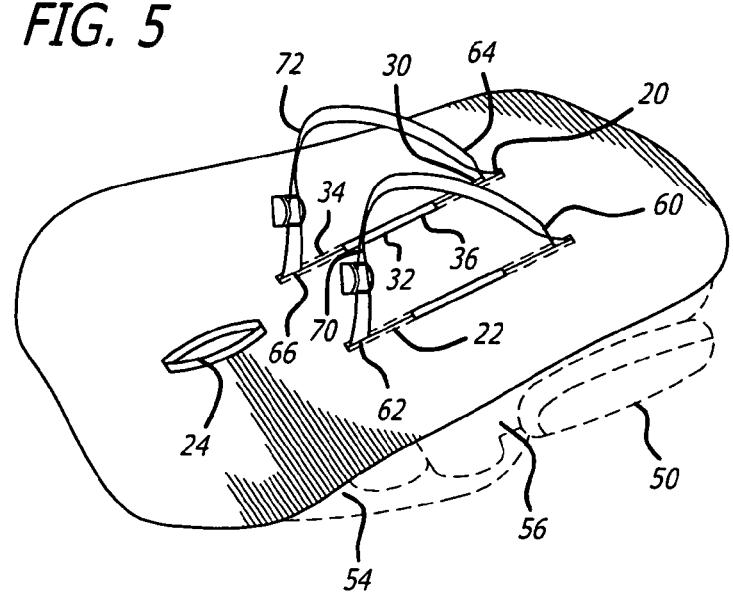
FIG. 5 is a perspective view of the seat cover shown in FIG. 3 of the drawings when mounted on a infant/child seat, with the apertures in the closed position.

The elongate shape of the slots 20 and 22 allow the entire front section of seat belts 70 and 72 to be pulled therethrough as can be seen in FIG. 4 of the drawings. Once pulled through, as seen in FIG. 4, the fastening means 36 is sealed to leave only small apertures 42 and 44 at the upper section 30 and the lower section 34 respectively, as illustrated in FIG. 5 of the drawings. Note that the dimensions of the small apertures 42 and 44 can be varied so as to be larger or smaller, by regulating the size of the fastening means 36. Therefore, the size of the small apertures 42 and 44 need not be on the scale shown in the drawings but can be made longer or shorter so that different requirements and preferences can be accommodated.

With the seat belts 70 and 72 pulled through the slots 20 and 22, and the slots 20 and 22 sealed and closed as shown in FIG. 5 of the drawings, a safe, easy and effective method is provided to instal a seat cover of the invention. No complex time consuming procedures are required to remove and reinstall the seat belts and, further, the unsightly gaping spaces which are present without the fastening mechanism are eliminated or significantly reduced. Thus, seat covers can be changed often and simply with worrying about safety and cleanliness issues.

In other embodiments of the invention, a fastening mechanism other than Velcro™ may be used. Thus, a hook and eye arrangement, zippers, buttons or tying cords are just examples of the various types of fastening mechanisms that can be used within the scope of the invention.

The invention also provides for a hood structure which can be easily removed and replaced. In accordance with another aspect of the invention, there is thus provided a hood for use with an infant/child seat, the hood typically comprising a support bar having ends connectable to the infant/child seat, and a fabric hood piece attached to the support bar, the fabric piece having a hem formed by a releasable fastening means, such as Velcro™, so that the hood piece can be easily removed and installed on the support bar for mounting on the infant/child seat.

Figure 6:
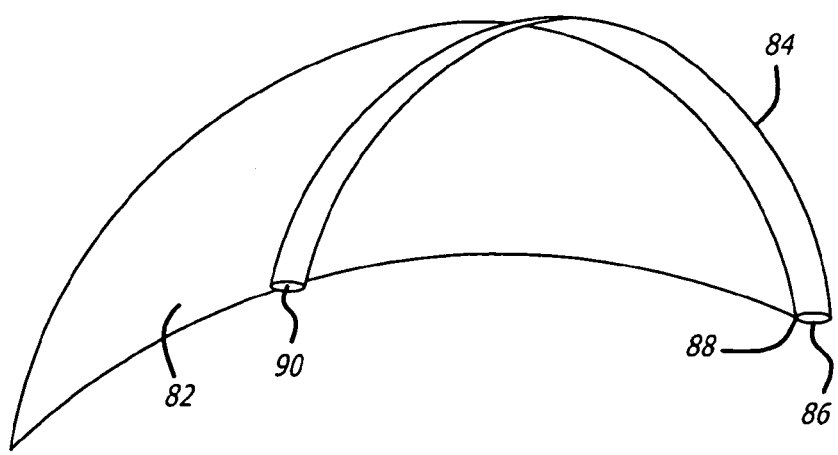
FIG. 6 is a perspective view of a hood structure attachable to an infant/child seat.

One such hood arrangement can be seen in FIG. 6 of the drawings. A hood structure 80 comprises a hood 82 designed to shield or protect the infant's face from the sun, rain, or other condition. The hood 82 has an edge 84 which is seamed to form a channel 86. The channel 86 receives an elongate and flexible rod whose ends (not shown) extend outwardly through openings 88 and 90 and fasten to the seat or frame. The rod can be easily installed and removed making the hood structure 80 a convenient, safe and simple accessory to use.

The invention is not limited to the precise details described herein and variations and modifications can be made within the scope of the invention. Different types of fabric can be used to construct the seat cover, the slots may vary in length according to the specific infant/child seat for which it is designed and the location of the seat belts, and the size and length of the fastening mechanism on the slot can be varied according to preselected criteria.

The invention claimed is:

1. A seat cover for an infant/child seat having a seat portion and a back portion and straps for securing an infant/child within the seat, the back portion having two shoulder straps, each shoulder strap extending from a rear of the back portion to a front of the back portion through an upper and lower slot in the back portion of the infant/child seat respectively, the seat cover comprising:
   a removable cover member comprised of a non-rigid material and having a peripheral edge for releasably mounting the cover member on at least a part of the back portion of the infant/child seat;
   at least one aperture formed in the cover member for receiving one of the straps to allow a part of the strap to pass therethrough, the aperture comprising an elongate slot having an upper end for receiving the shoulder strap as it emerges from the upper slot and a lower end for receiving the shoulder strap as it emerges from the lower slot; and
   fastening means on at least one of the apertures for opening and closing at least a portion of the aperture, the fastening means of the apertures being formed along edges of the apertures between the upper end and the lower end.

2. A seat cover as claimed in claim 1 wherein the cover member is configured for mounting over the seat portion and back portion of the seat.

3. A seat cover as claimed in claim 1 wherein the peripheral edge is an elasticized peripheral edge to facilitate releasable attachment of the cover member to the seat.

4. A seat cover as claimed in claim 1 wherein the cover member has a seat cover portion for covering the seat portion of the seat and a back cover portion for covering the back portion of the seat.

5. A seat cover as claimed in claim 4 wherein the apertures comprise a pair of the elongate slots in the back cover portion of the cover member, the pair of elongate slots being positioned on the back cover portion so as to correspond approximately to the position of the straps on the back portion of the infant/child seat.

6. A seat cover as claimed in claim 5 wherein each elongate slot has a longitudinal edge, and the fastening means is located along at least a portion of the longitudinal edge.

7. A seat cover as claimed in claim 6 wherein each elongate slot comprises an upper region and a lower region, with an intermediate region therebetween, the fastening means being configured so as to fasten the longitudinal edges of the intermediate region to close the elongate slots at the intermediate region, with the upper region and lower region being open.

8. A seat cover as claimed in claim 4 further comprising an aperture in the seat cover portion for receiving a strap from the seat portion of the seat.

9. A seat cover as claimed in claim 1 wherein the fastening means comprises buttons.

10. A seat cover as claimed in claim 1 wherein the fastening means comprises a zipper.

11. A seat cover as claimed in claim 1 wherein the fastening means comprises a plurality of hook-and-eye connectors.

12. A seat cover as claimed in claim 1 wherein the fastening means comprises a plurality of fastening studs.

13. A seat cover as claimed in claim 1 wherein the fastening means comprises fabric strip connectors.

14. A seat cover as claimed in claim 1 further comprising a hood associated therewith, the hood being mountable on the seat in an adjustable manner so as to provide a protective shield or barrier when located in a selected position.

15. A seat cover for an infant/child seat having a seat portion and a back portion and straps for securing an infant/child within the seat, the back portion having two shoulder straps, each shoulder strap extending from a rear of the back portion to a front of the back portion through an upper and lower slot respectively, the seat cover comprising:
    a removable cover member comprised of a non-rigid material and having a peripheral edge for releasably mounting the cover member on at least a part of the back portion of the infant/child seat;
    at least one aperture formed in the cover member for receiving a strap to allow a part of the strap to pass therethrough, the aperture comprising an elongate slot having an upper end and a lower end for substantially corresponding to the upper slot and the lower slot respectively; and
    fastening means on at least one of the apertures for opening and closing at least a portion of the aperture, fastening means of the apertures being formed along edges of the apertures between the upper end and the lower end.

16. A method of mounting a seat cover on an infant/child seat having a seat portion and a back portion, and straps for securing an infant/child in the seat, the back portion having two shoulder straps, each shoulder strap extending from a rear of the back portion to a front of the back portion through an upper and lower slot respectively, the method comprising:
    forming an elongate aperture in the seat cover, the aperture extending at least between a first point at which a strap crosses from the rear of the seat to the front of the seat, and a second point at which the same strap crosses from the front of the seat to the rear of the seat, the aperture comprising an elongate slot extending at least from the upper slot to the lower slot of the seat for the shoulder straps, and providing a fastening member along at least a portion of the aperture;
    either opening the aperture by unfastening the fastening member to enable the seat cover to be removed without interference from the straps, or closing the aperture by fastening the fastening member when the straps have been pulled therethrough so as to leave openings only at or about the first and second points where the straps cross between the front of the seat and the rear of the seat, the fastening member of the apertures being formed along edges of the apertures between the upper slot and the lower slot of the seat.

17. A seat cover for an infant/child seat having a seat portion, a back portion and a pair of straps each of which has an upper end and a lower end which pass through the back portion for securing an infant/child within the seat, the seat cover comprising:
    a removable cover member comprised of a non-rigid material and having a peripheral edge for releasably mounting the cover member on at least a part of the back portion of the infant/child seat;
    a separate aperture formed in the cover member for each of the straps, each aperture being dimensioned so that it extends to receive both the upper and lower ends of each strap to allow a part of the strap to pass therethrough.

* * * * *